United States Patent [19]

Marathe

[11] 4,306,293
[45] Dec. 15, 1981

[54] ENERGY MONITORING SYSTEM

[76] Inventor: Sharad M. Marathe, P.O. Box 41, Fond du Lac, Wis. 54935

[21] Appl. No.: 71,044

[22] Filed: Aug. 30, 1979

[51] Int. Cl.³ .............................................. G01K 17/16
[52] U.S. Cl. .................................. 364/557; 364/581; 73/193 R
[58] Field of Search ............... 364/418, 550, 557, 483, 364/492, 493, 581; 340/150, 151; 73/193 R; 179/2 AM; 165/11, 13, 22

[56] References Cited

U.S. PATENT DOCUMENTS

| | | | |
|---|---|---|---|
| 3,842,206 | 10/1974 | Barsellotti et al. | 179/2 AM |
| 3,922,492 | 11/1975 | Lumsden | 179/2 AM |
| 4,048,852 | 9/1977 | Sakakibara et al. | 73/193 R |
| 4,077,061 | 2/1978 | Johnston et al. | 364/492 |
| 4,150,788 | 4/1979 | Matsumoto et al. | 165/22 |
| 4,153,936 | 5/1979 | Schmitz et al. | 364/493 |
| 4,157,034 | 6/1979 | Buchele | 73/193 R |
| 4,187,543 | 2/1980 | Healey et al. | 165/22 |
| 4,224,825 | 9/1980 | Feller | 73/193 R |

*Primary Examiner*—Mark E. Nusbaum
*Assistant Examiner*—Gary Chin
*Attorney, Agent, or Firm*—Andrus, Sceales, Starke & Sawall

[57] ABSTRACT

The individual energy monitor in a multiple unit complex includes means for measuring the temperature differential at the inlet and outlet of each consuming unit. An on-site microprocessor functioning as a muliple meter unit is coupled to all such consuming units and stores the temperature differential with appropriate processing to record the heat usage during a known time. The microprocessor meter can store the individual energy usage of many consuming units and can be remotely or locally interrogated for purposes of collecting of the necessary data when and as required for billing and the like with equitable allocation of costs among the units based on such individual energy usage. The microprocessor meter continuously, sequentially and cyclically reads the inlet/outlet temperature sensors. The metering system may assume that the total fluid flow from the heat source unit is divided essentially equally amongst the several flow paths to directly allocate costs or may weight the temperature differential in accordance with various factors such as the flow resistance of each path, the flow characteristic of a common circulation pump, the output of a single flow sensor connected to detect the total flow rate, the actual opening of each consuming unit, and even the individual monitored flow through each consuming unit.

15 Claims, 5 Drawing Figures

ENERGY MONITORING SYSTEM

BACKGROUND OF THE INVENTION

The present invention relates to a system for essentially continuously monitoring, measuring and recording consumption of individual utility loads at a multiple consuming site, and in particular to the monitoring, measuring and recording the energy usage by the individual units in a multiple unit complex.

Multiple unit buildings and complexes may provide a centralized public utility connection or source for the distribution to the individual dwellings or units. Such utilities may consist of water, gas, electricity, heating and the like. Although in the distribution of certain products such as electricity, individual metering devices are often provided, they are not, for example, conveniently provided for a central air conditioning system such as a heating and/or cooling means and the like. Without individual allocation, tenants or group residents do not have any particular incentive to reduce their energy usage because they either do not pay any of the cost or it is distributed over the total number of residents and its impact is thus significantly reduced. As a practical matter, decentralized heating systems are often used, with separate individual heating units such as electrical heaters, individual heat pumps and/or small furnaces provided to each tenant. Such separate units, however, are relatively more expensive in the initial cost and installation as well as in the overall operating cost. Central heating and cooling systems have a distinct advantage particularly in moderate and large complexes because of significantly higher efficiency and lower initial costs. However, the allocation of heating costs between the individual building units according to their individual usages is generally expensive as a result of the necessary individual monitoring and recording devices required. For example, U.S. Pat. No. 4,048,852 to Kaichi Sakakibara et al discloses a combined temperature reading and flow reading on an individual basis for metering of heat energy consumed in a particular dwelling unit. Each unit has means for measuring the inlet and outlet temperatures and developing a variable frequency pulse output signal train with the frequency proportional to the heat level in combination with a flow measuring device for controlling the operative reading time interval for each temperature readout unit. The device of course includes a special flow meter for each individual line or unit as well as the necessary interfacing and conversion equipment to establish the pulse output for driving of individual counters. Other patents show similar as well as other integrating flow measuring systems including various mechanical and electrical temperature and metering combinations. Generally similar systems are discussed in the earlier U.S. Pat. Nos. 2,210,082 and 3,639,737. The concept of individual unit monitoring with individually tailored systems is also shown for a hot air system in U.S. Pat. No. 4,049,044 wherein each separate blower unit to distribute the conditioned air throughout the individual units is coupled to drive a related integrating means to produce a readout in accordance with the fan usage. For example, in Europe, heat responsive metering units which are hung directly on the heat exchanges are widely employed for monitoring and recording of the actual energy usage based on the hot water flowing through a radiator. Such systems are widely accepted, with various countries providing legal regulation of their usage. Generally, it has been found that the residents' incentive is such as to substantially reduce their usage of energy and studies have indicated that the reduction may be on the order of 30%. The current energy crisis thus would indicate that individual metering of energy consumption in multiple unit complexes is a highly desirable social factor as well as an advantage to the individual residents to insure that they are being burdened with only those costs related to their actual consumption. However, the Federal Department of Energy of the United States has reported in a report that present monitoring and remote reporting systems generally cost from $600. to $1300. per apartment and as such are not economically acceptable.

Where individual meters are used, various remote reading systems have also been suggested wherein the individual meters can be read and the output sent to a central station, either periodically or on demand, for appropriate monitoring and control, such as billing and the like. For example, U.S. Pat. No. 4,086,434 discloses the concept of an on-site microprocessor unit for reading and storing of the output of a plurality of individual meters, with telephone coupling means for transmitting the readings of the several meters over the telephone line to a central processing system. Similarly, the earlier U.S. Pat. No. 3,868,460 discloses a central computer having means for interrogating remote stations for meter information and using such information for billing and the like. These systems of course rely on and require separate meters for each load with the corresponding complexity, cost & the like.

Thus, in spite of the ever increasing cost of energy, multiple unit building owners have not been offered a properly coated automated system with an appropriate cost recovery period, so far as the present inventor knows, for allocating individual charges to the users in any proper relationship to the actual energy usage by the customer.

There is therefore a need for a single, reliable and relatively inexpensive monitoring and measuring system for recording and processing the energy or similar utility consumption in multiple unit complexes to minimize energy usage and establish an incentive to the residents to assist in such efforts.

SUMMARY OF THE PRESENT INVENTION

The present invention is particularly directed to a monitoring and processing system for measuring individual energy usage and processing and recording of such information to record essentially actual distribution of the total energy consumption and thereby permit equitable allocation of costs among the units based on such individual energy usage. Generally, in accordance with the teaching of the present invention, sensing units are mounted in each of the energy consuming units for generating an appropriate electrical signal which signals are coupled to a small on-site microprocessor functioning as a multiple meter unit. The microprocessor unit has a memory unit in which the output of the sensing units after appropriate processing to record the heat usage during a known time is stored in appropriate form for subsequent output to a collection system such as a central billing station or monitoring station. The microprocessor meter can store the individual energy usage in a very substantial number of units and can be remotely interrogated for purposes of collecting of the necessary data when and as required; for example, the billing and the like. The microprocessor meter establishes a more or less continuous measurement of the energy usage and permits the reading of the total value of the usage to any given moment as required. Thus if a tenant or resident transfers from the unit, the utility cost to the time of transfer or moving can be readily and immediately determined.

In accordance with a particular aspect and feature of an embodiment of the present invention, the microprocessor meter continuously, sequentially and cylically reads temperature sensors coupled to the heat exchange means in the several energy consuming units, as by coupling to the individual pipes leading to and from the individual exchange means. The microprocessor continuously samples the temperature sensors and computes the differential temperature, converts such differential temperature into a consumption factor, and stores it in an encoded position in a memory. Thus, during stand by periods, the inlet and outlet temperature conditions to and from the consuming units are essentially equal. However, whenever there is a demand for energy, a related energy fluid flow and temperature differential will exist. The microprocessor detects such temperature differential and through weighting of factors accurately calculates the actual energy consumed such as more fully described hereinafter. The preferred measurement and reading of the temperature differential rather than the individual temperature at the inlet/outlet of each consuming unit minimizes the complexity and cost of the system. This invention may thus provide a simple, reliable and relatively inexpensive means of monitoring the energy consumption in a substantial manner of consuming units without the complex and individualized interfacing and recording units such as generally employed in prior art devices. The several readings are stored for the totality of the energy consuming units and can then be interrogated by any one of a wide variety of methods for generating of heat use statements for each individual consuming unit. For example, a suitable telephone telemetering system may be provided in which a central station "calls" the on-site microprocessor meter, with encoded transmission therefrom to the central computer for immediate or subsequent processing of the energy usage data. Such interrogation can also be made using a portable reading device, or even an on-site centralized computer in a large complex and the like.

The present simplified metering system is based on an assumption that the total fluid flow from the centralized heating unit is divided essentially equally amongst the several flow paths which are opened; and as the number of flow paths increase or decrease, the total flow through all paths change in a like proportion. The factual basis and accuracy for such assumption is determined by having flow paths which present the same resistance when connected with all other flow paths. This factor can be periodically checked or even measured or monitored by suitable sensing means in the several flow paths. The flow distances, the relative age of the systems and the like may cause a change in the relative flow resistant characteristic. A distinct advantage of the present invention is that the microprocessor meter unit may be conveniently set to modify each reading if the resistance of the path or any other effective characteristic changes in order to maintain the necessary degree of accuracy. The microprocessor meter can be readily adapted to "weight" the readings in accordance with actual flow characteristics. For example, in accordance with an aspect of the present invention, the circulation system is provided with an appropriate common forced circulation or pump means. The flow characteristic of the circulation pump means is available, can be determined through simple measuring tests, or even monitored by the microprocessor meter. This information along with the variation in flow resistance of the several dwellings provides a data base for weighting each energy measurement of an energy consuming unit. Opening and closing of zone valves 17 may also be monitored and used as input data. All such information as discussed above can be readily stored in the microprocessor and directly used through any well known processing systems to appropriately "weight" the periodic temperature differential readings. Even further sophistication can be introduced into the system. In another novel embodiment, for example, a single flow sensor is connected for detecting the actual total flow rate, and for optimum results, the opening of each consuming unit as by detection of the opening of zone valves is monitored by the microprocessor. The characteristic of the circulation pump, the flow paths resistances, the total demand, the opened zones, and the monitored flow rate would provide a further data based upon which to appropriate "weight" the measured temperature differential data. To produce a maximum degree of accuracy of course, each flow path would be separately monitored as to flow and temperature differential.

In a practical implementation of the present invention, an electrical analog output of each sensor is coupled to the microprocessor through a multiplexing device, which operates in a continuous, cyclical manner to sample each sensor on a time sequence, such as once each minute. Each reading may consist of a series of readings to prevent transient type response. In case of any analog signal an analog to digital converter and other interfacing means establishes a corresponding digital signal which can be directly processed by the microprocessor meter. The microprocessor meter may be any desired or known unit which is adapted to properly receive and process the paired temperature signals from each unit. The microprocessor meter of course monitors and controls the sequence of the multiplexes for reading of the several pairs of sensors or channels, processing of the received data and storing the temperature differential based information in appropriate memory locations. The microprocessor meter is continuously updated and such updated energy data is instantaneously available for readout through a suitable interfacing output device. The central computer or station receives some or all of the energy data, after which the central station automatically disconnects. The microprocessor meter of course continues to update the energy consumed data during such readout process. Generally the system of the present invention provides an accuracy of distribution in excess of 80%, with an accuracy of 80 to 85% with even the simplest system and may readily increase to a level of 95% by appropriate measurement of other factors and sophisticated "weighting" of the "temperature differential" readings. The microprocessor meter also significantly reduces the cost, and in relatively large buildings an installation cost on the order of 50 to 120 present day dollars per consuming unit is feasible. Meter reading, billing and maintenance should be minimal and generally on the order of 2 to 3 present day dollars per consuming units. The total system is readily made as a solid state electronic device employing well known and established components, thereby producing a practically indefinite life with minimal maintenance requirements.

In summary the present invention is particularly adapted to a low cost, multiple consuming energy monitoring system for accurately allocating the energy consumption from a central energy source for environmental air conditioning systems.

BRIEF DESCRIPTION OF ILLUSTRATED DRAWINGS

The drawings furnished herewith illustrate a preferred construction of the present invention in which the above advantages and features are clearly disclosed as well as others which will be readily understood from the following description.

DESCRIPTION OF THE ILLUSTRATED EMBODIMENT

Figure 1:
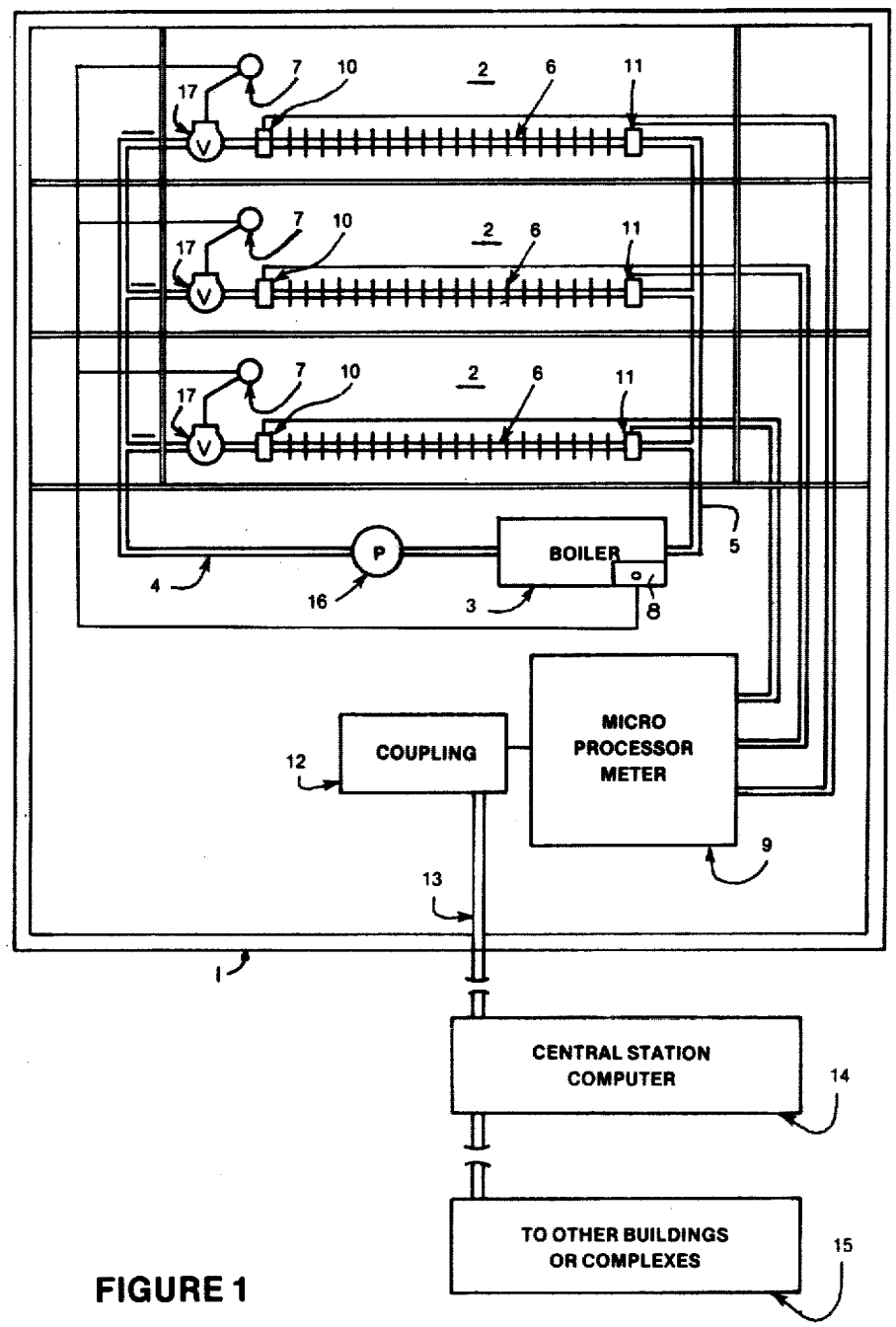
FIG. 1 is a diagrammatic illustration of a multiple unit housing complex including a central heating and cooling system with an energy accounting system constructed in accordance with the present invention.

Referring to the Drawings and particularly to the FIG. 1, the present invention is illustrated as applied to a multiple unit apartment complex which may have one or more buildings 1, each having a plurality of individual dwelling units 2. A central air conditioning source 3 is provided for heating all units 2, which in the illustrated embodiment of the invention is a hot water boiler adapted to circulate hot water to the several units. The boiler 3 has a common outlet pipe 4 which extends to and past each of the dwelling units 2 with interconnecting branch lines to an outlet connected via a common return pipe 5 to the inlet side of the boiler 3. Each of the dwelling units 2 includes suitable heat exchangers 6 which are connected to the pipe 4 and includes a branch or loop which extends through the dwelling unit 2 and back to the pipe 5. The length of the loops and number of exchangers 6 will normally vary with the size of unit 2. Either a series or parallel flow system to the several exchangers 6 may be provided. The exchangers 6 in the several dwellings units 2 operate to give up part of the heat from the hot water to the adjacent space, and thus the water exits from the dwelling unit 2 at a reduced temperature.

Each of the dwelling units includes its own thermostat unit 7 which is coupled to the boiler control 8 and/or a related zone valve and is operable to fire the heating unit and provide for circulation of the heat carrier medium in response to a demand for heat in that unit. As each of the unit 2 arbitrarily, and in accordance with that users desires, consumes energy from the common energy or heat source 3 the proportion of the total quantity of energy consumed by each may vary significantly, even though the units 2 may be identical. Thus, location, wind factors and most importantly an individual's own preference may effect the individual usage. If the size of units 2 vary, the difference may be even more significant. Without some special monitoring means, however, the owner or the residents have no manner of equitably distributing the cost of the total load. In accordance with the present invention, a common microprocessor meter unit 9 is provided and coupled to each of the individual dwelling units 2 and particularly to the inlet and to the outlet of each branch line to essentially continuously monitor and record temperature differential of the input and output hot water from each unit and establish the energy consumption substantially in accordance with the actual consumption. The microprocessor meter unit 9 may be of course conveniently located within the building and provided with a special enclosure. Generally, in the illustrated embodiment in the invention as shown in FIG. 1, temperature sensors 10 and 11 are shown coupled to the opposite side of each exchanger 6 and record the changes in the temperature as created by flow of hot water through the unit 6. Sensors 10 and 11 may be coupled to directly produce an electrical data signal related to the temperature differential. If a plurality of exchangers 6 are used in a unit 2, an inlet temperature sensor 10 is coupled to the exchanger inlet connection to the common supply line 4 and an outlet temperature sensor 11 is coupled to the last exchanger outlet connection to the common return line 5. The temperature differential, as more fully discussed hereinafter, is closely indicative of the actual consumption, if the total flow through the several units 2 is the same. In many large complexes, the flow branches of each unit 2 are substantially similar and the temperature differential may therefore be directly used as the basis for distributing of the total load consumption. Additionally the pump characteristic or curve also provides flow-related data or information which may be used if necessary or desired in the determination and allocation of the energy consumption.

The sensed temperature information or data is transmitted by signaling leads from each sensor to the microprocessor meter unit 9 which functions as a logic unit to directly monitor and establish a record of the consumption based on the information contained in such temperature signals from the temperature sensors 10 and 11. The microprocessor unit 9 constitutes a logic device which is readily programmed to sequentially read the sensors 10 and 11, relate the signals into a proportionate energy consumption signal and store such energy related signals for subsequent readout. In the illustrated embodiment of FIG. 1, a coupling unit 12 interconnects the microprocessor unit 9 to a telephone line 13 which connects the output of the microprocessor means to a central station computer 14 along with other similar constructed complexes, as shown at 15. Each building complex and particularly each microprocessor meter 9 is assigned its own telephone number. The central station computer 14 can then periodically read the several individual records in the microprocessor meter 9 for monitoring of the usage over any given period of time. Such information may then be used to provide necessary billing information, analysis of energy distribution and consumption, and like necessary technical, business and financial information. The owner of the building complex now has a means of directly charging the residents for their usage and can thereby be protected against continuing rising energy cost. Each resident on the other hand has an incentive to use energy only as required in order to minimize his cost.

The microprocessor meter 9 thus operates to periodically sample each of the sensors 10 and 11 in a continuous cyclical manner, thereby continuously updating the record of the temperature usage. This information is directly stored after appropriate processing, which may include appropriate weighing for various factors involved in the energy distribution system as more fully developed hereinafter. The present system as diagrammatically illustrated in FIG. 1 provides a total monitoring controlling and processing system using a simple real relatively simple direct usage of the microprocessor as a multiple meter. The present invention is however particularly adapted to various levels of sophistication and control as required or desired by any particular type of a demand requirement.

Figure 2:
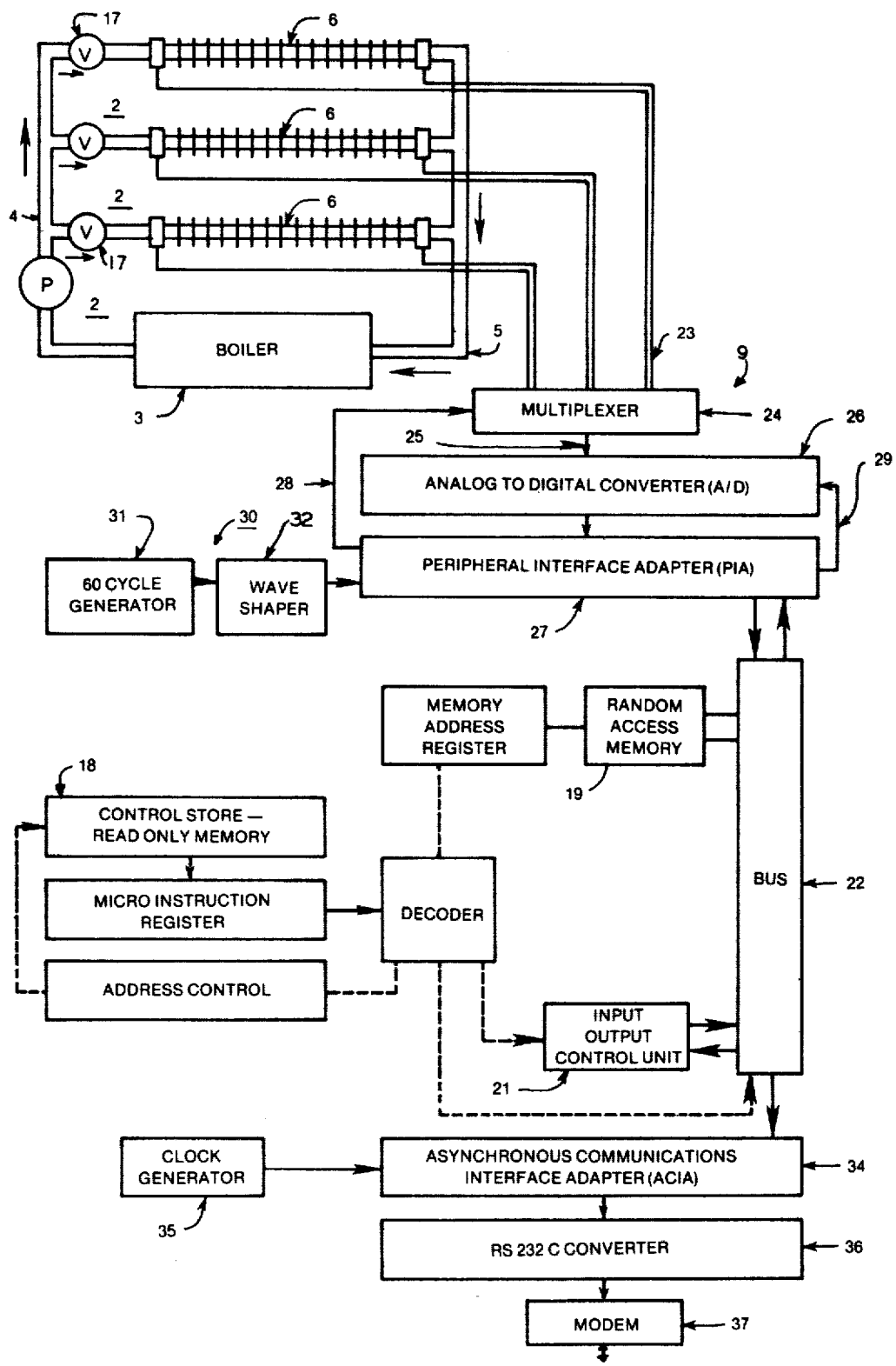
FIG. 2 is a diagrammatic illustration of the multiple units of the multiple unit heating system shown in FIG. 1 and more clearly illustrating certain elements of the present invention.

A practical system installation is diagrammatically illustrated in FIG. 2, wherein like elements of FIG. 1 are correspondingly numbered for simplicity of illustration and description.

Referring particularly to FIG. 2, the output of the boiler 3 is pressurized by a suitable pump 16 to establish a forced flow of hot water through the line 4 to the several dwelling units 2 and particularly to the heat exchangers 6. Each of the branch lines is provided with its own control valve 17 for selectively circulating of hot water through the associated heat exchanger 6. The sensing system employed in the embodiment of FIGS. 1 and 2 includes individual temperature sensors 10 and 11 connected to the opposite ends of the heat exchangers 6 for selectively measuring the temperature at the inlet to the dwelling 2 and the associated heat exchanger 6 and the interrelated exiting temperature from the corresponding heat exchanger 6, and connected to produce a signal proportional to temperature differential.

Thus, the total heat used by the total complex is equal to the total temperature drop between lines 4 and 5 times the total rate of flow through such lines and thus the complex. Similarly, the drop through each of the individual units 2 is equal to the individual temperature drops times the individual flows. The heat balance equation for the complex and the several dwellings units of course requires that the total complex heat load equal the summation of the individual loads or consumptions, and may be stated as: $(T_4-T_5)$ $(F_T)=(\Delta T_1)$ $(F_1)+(\Delta T_2)$ $(F_2)+(\Delta T_N)$ $(F_N)$. A precise and accurate distribution would require the system sensing of not only the temperature differential but the absolute individual flows in relationship to the total temperature differential and the flow. This of course would require significant temperature and flow measuring devices with a corresponding complexity and cost as well as detailed processing time and cost. However, the inventors have realized that with such a system, one can readily and quite accurately allocate the individual usage based on the fact that the total flow is often divided equally among the total number of open flow paths, and/or such variation may be adjusted for by modification of the temperature drop readings. Further, as a number of flow paths increase or decrease, there will be a corresponding change in the total flow. The present invention provides a simple, reliable and inexpensive monitoring and processing system therefore by assuming that the relative heat usage in each dwelling is directly proportional to the measured temperature drop which occurs in such dwelling.

The temperature sensors 10 and 11 may be simple well known thermistors which are coupled to the inlet and outlet sides of the heat exchanger 6. The thermisters generate an electrical analog signal which is directly and accurately proportional to the temperature differential of the water, and therefore directly record the temperature differential through each branch.

Figure 3:
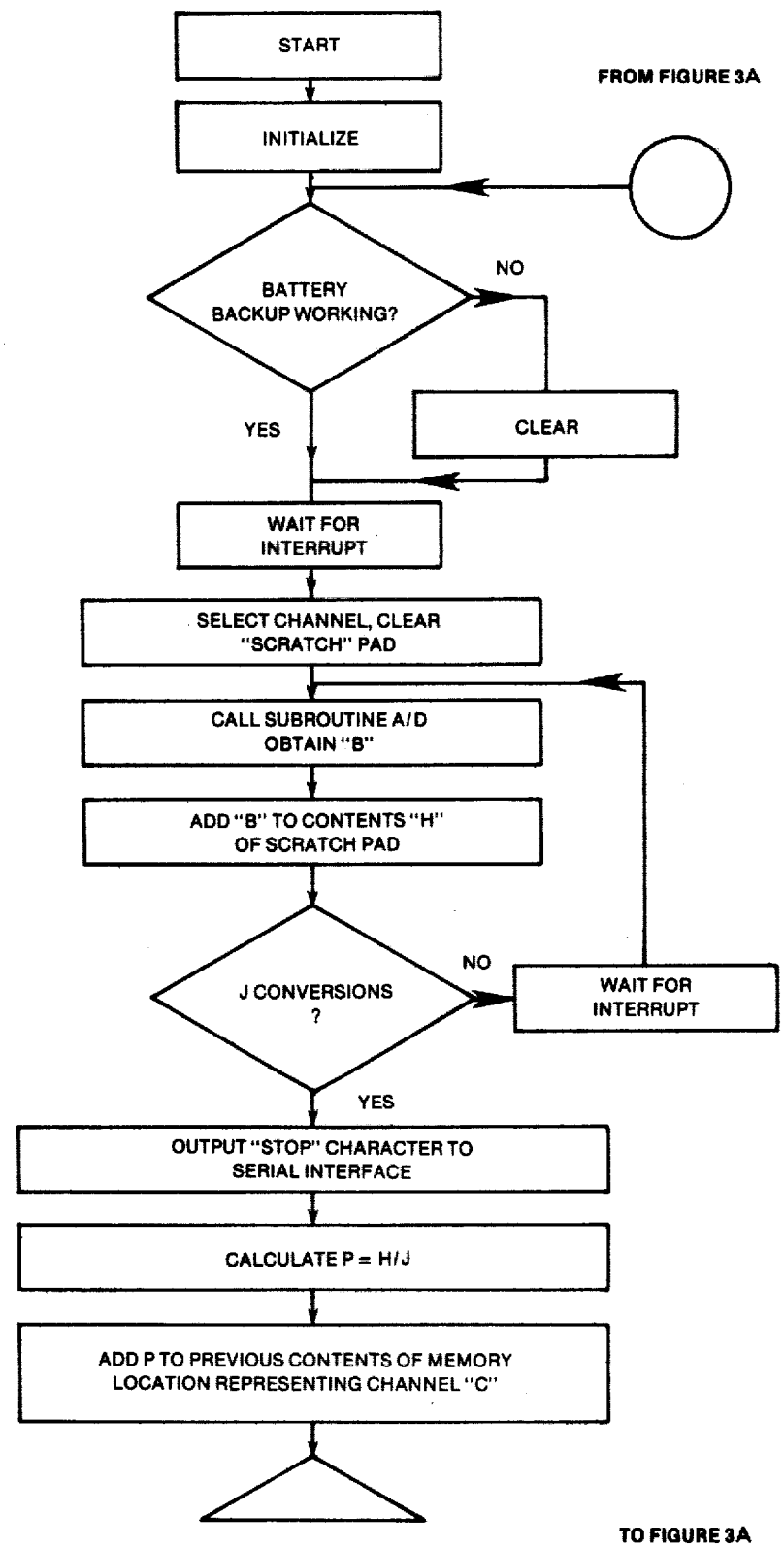
FIGS. 3 and 3A are flow charts illustrating the operation of the control system shown in FIGS. 1 and 2.
Figure 3A:
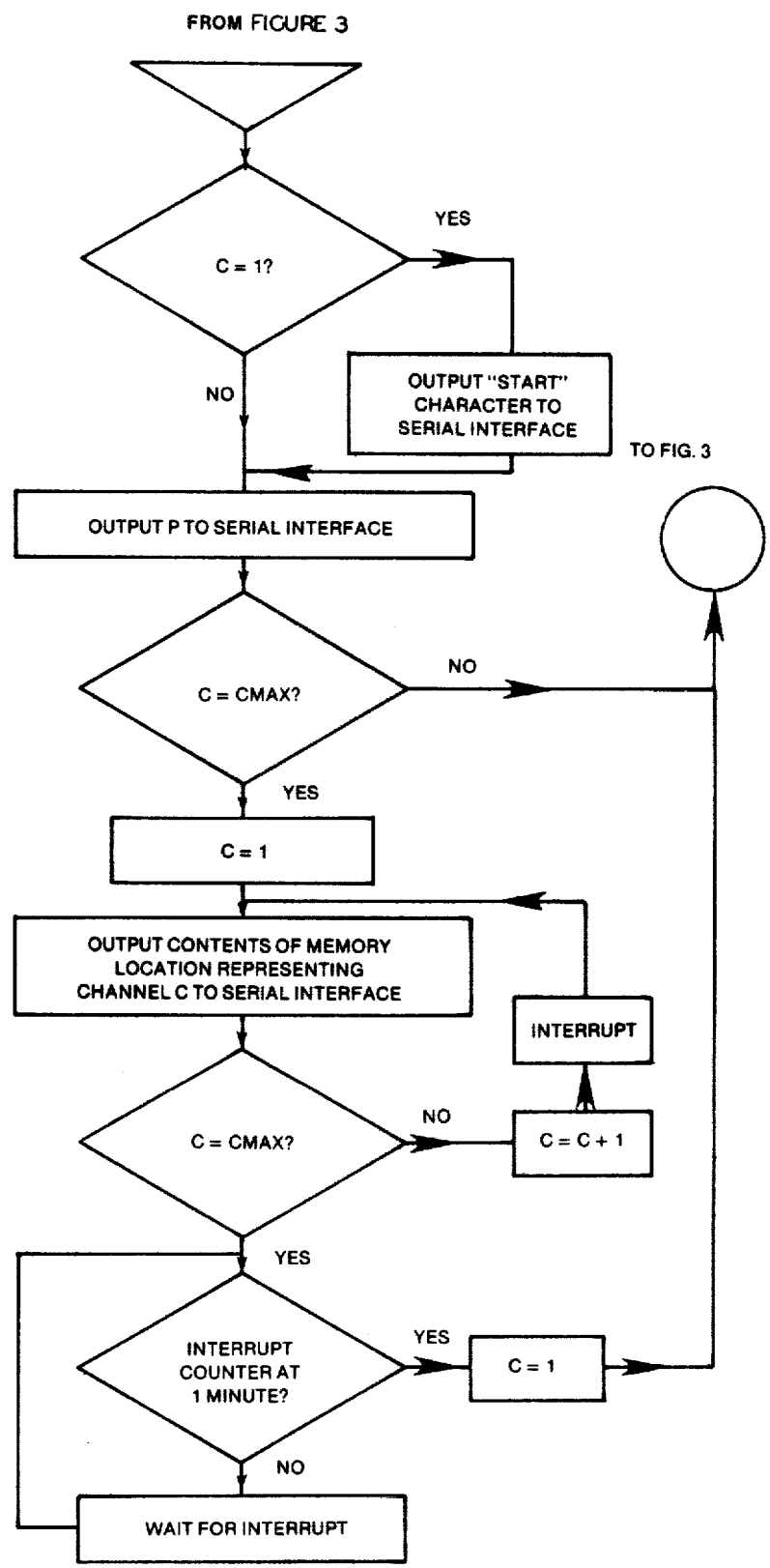

The microprocessor unit 9, as shown in FIG. 2, is a well known building block in which the data storage and processing are controlled by an internal control unit to provide logical and sequential sampling, processing and for storing the temperature differential data information for each unit 2 and for the total building complex. The microprocessor is illustrated in FIG. 2 in a functional block diagram with a suitable conventional bus structure. The system basically includes a ROM memory unit or section 18 within which a fixed program is provided for controlling the logical and sequential inputting of data, processing of such data, storing such data, and outputting such data. A RAM memory section 19 is provided for appropriate processing and storage of the data. The data is introduced and output through a suitable I/O unit 21 connected to the external system by a common bus 22. The microprocessor 9 of course operates in accordance with specific instructions which are contained within the control unit 18 and the routing is controlled by appropriate addressing and decoding means, all under control from the basic program control unit 18. For example, a 6800 microprocessor manufactured or sold by Motorola, Inc. of Chicago, Illinois, may be used. The operation and connection of the microprocessor will be readily understood by those skilled in the art, particularly when taken with the flow chart of FIG. 3 and a brief program listing of the reading, processing sequence and outputting of data based on the temperature signals differential from sensors 10 and 11 is made a part of the file wrapper of this application in an attachment to the end of this application. Thus, the attached program listing for one embodiment of the invention is a typical program based upon the flowchart sequence shown in FIG. 3 and will be readily understood by those skilled in the art.

More particularly in the illustrated embodiment of the invention, the several sensors 10 and 11 of each dwelling unit 2 are similarly interconnected to individual inputs 23 of a multiplexer 24 which is adapted to transmit the signal from each of the sensors 10 and 11 to a common transmission line 25. The multiplexer is sequentially and cyclically operated to couple one line 23 at a time to line 25 to read the temperature setting of the each of the sensors for transmission to microprocessor 9. The rate of sampling is controlled by a suitable timing means, directly derived or controlled by the microprocessor 9 as subsequently described.

The output of the sensors 10 and 11 are analog signals and connected to an analog to digital converter 26 to convert each of the analog signals into an appropriate digital signal for processing by digital microprocessor 9. A peripheral interface device 27 of a suitable construction couples the input devices and digital signals to the microprocessor 9. The interface adapter 27 functions as a known gating device to bus 22 for establishing two-way communication between the temperature input section and the microprocessor 9. The peripheral interface adaptor transmits timing control signals to the multiplexer 24 to step from one input line 23 to the next, as shown by the interconnecting timing line 28 and to enable the A/D converter 26, as shown by line 29. A suitable control pulse source 30 such as a 60 cycle generator 31 in combination with a suitable waveshaping device 32 provides appropriate timing signals. The adapter 27 is actuated by the microprocessor 9 to transmit the signals to the multiplexer 25 and to the converter to provide for reading the sensors 10 and 11, converting such readings and transmitting the same to the microprocessor 9.

The microprocessor as noted previously constitutes a multiple meter for receiving and recording of the signals with or without appropriate modification, and then calculating the energy consumption based on the temperature differentials and storing such information. The particular logic sequence is stored in ROM section 18 of the processor memory. The data for each pair of temperature sensors 10 and 11 for a particular unit 2 is stored in a very particular and identifiable memory location directly encoded to the particular dwelling unit 2 to provide a detailed and updated record of the particular energy consumption for the particular dwelling unit 2 based on the temperature differential.

As shown in FIG. 2, the exchange units 6 in any particular unit 2 may vary in size or number from unit to unit. The load flow resistance, and therefore the actual total flow for the same temperature drops may change with flow paths, the number of heat exchange units in a dwelling and the like. Therefore in addition to the differential temperature data, the flow resistance characteristics may be of significance. Such information is readily determined by any suitable measuring devices on a continuous or periodic basis and stored in the microprocessor memory 19. In addition, the pump curve and/or the state of the zone valves provide data which can be used with the above data in the load consumption determination. The energy data based on the temperature differential signals for any given unit 2 are then directly modified and weighted to reflect the particular characteristic of its particular flow line. The stored energy data thereby is more accurately related to the particular unit usage to maintain a reasonably accurate relationship between the actual load consumption and the allocated load consumption, for subsequent processing.

The illustrated embodiment of FIG. 2 is particularly adapted to transmit the energy consumption data over a conventional telephone line 13. This may be readily provided by the use of a known clocked interface adapter unit 34 shown as a serial interface unit. Interface unit 34 accepts a multibit stored data number from the microprocessor 9 and functioning as a gate under the control of the microprocessor appropriately encodes and transmits such information in a serial fashion one bit at a time. A clock unit 35 provides appropriate timed spaced transmission. The transmitted data is coupled to line 13 through a conventional external coupler 36, such as an RS232 coupler which modifies the data and places it in a form for proper transmission over conventional telephone lines. The connection to the telephone lines 13 includes a suitable coupling unit generally identified as a modem 37 which answers an incoming call and provides the final processing and encoding of data word, filtering of the bit signals and the like to create reliable transmission to the central station 14. The modem 37 provides two way communication to line 13 and in particular coupling of the microprocessor meter 9 for the initiation of the data readout cycle.

The building complex microprocessor meter 9, as previously noted, may be assigned its own telephone number. The central station 14 couples to the complex microprocessor meter 9 by establishing a telephone call to such unit, with a telephone answering signal transmitted by modem 37 to microprocessor 9 which is programmed to continuously update the information on its outputs to provide the information in response to the answering of the call and couples the building complex unit to the central station of computer for transmission of the data information.

In summary, the illustrated embodiment of the invention operates with microprocessor meter 9 coupled to the several sensors 10 and 11 to monitor and read the output of the several sensors and preset periodic basis, such as once each minute. This information can be processed with necessary modification by weighting data, and the updated energy information is stored to provide a current update at a desired time interval such as one minute. On a periodic basis, such as once a month, the central station 14 calls the complex microprocessor unit 9 and reads the most current updated information. The total information of microprocessor meter for most complexes may be read and transmitted in less than two minutes. During the readout, the microprocessor continues to read and update the record of the temperature conditions and energy consumptions by units 2.

The central station 14 receives the information and processes such information into billing, load analysis or the like.

For example, assume that the three load branches 2 or consuming unit 6 have respective resistances which establish flows in gallons per minute of 2.0, 2.2 and 2.4. The weighting factor would be calculated by dividing the flows of each branch 2 by the lowest flow rate of all branches, producing factors of 1, 1.1 and 1.2. The temperature differential multiplied by such weighting factor, as well as such other modifier as provided within the presettable portion of the logic unit, establishes the unit usage of the particular consuming unit 2. For example, if the temperature differential reading signals produce proportional signals of 15, 20 and 18, an energy consumption table would appear as follows:

| Branch | Flow Rate- Gallons per Minute | Weighting Factors | Differential to Outlet |
| --- | --- | --- | --- |
| Top | 2.2 | 1.1 | 15° F. |
| Middle | 2.0 | 1.0 | 20° F. |
| Bottom | 2.4 | 1.2 | 18° F. |
| Total System | 6.6 | | 17.2° F. |

The 17.2° F. is the drop between the input and output sides of the boiler 3.

The unit readings are created at fixed intervals which will practically be at intervals of less than five minutes and generally less than one minute. The unit dosage is accumulated and after a fixed or otherwise determined period, the accumulated totals read out for a purpose desired, such as billing of the user for his proportionate share of the total energy consumed. Such reading might readout as follows:

| Top | = | (1.1) (15) | = | 16.5 Units |
| --- | --- | --- | --- | --- |
| Middle | = | (1.0) (20) | = | 20.0 Units |
| Bottom | = | (1.2) (18) | = | 21.6 Units |
| | | Total | = | 58.1 Units |

The total cost is then allocated in accordance with unit usage and thereby charge each user his fair share of the actual costs involved.

As noted previously the novel system is advantageous in that it provides for not only simplified reading, recording and determining of load consumption but is readily adapted to further modifications and sophistication with minimum change.

Figure 4:
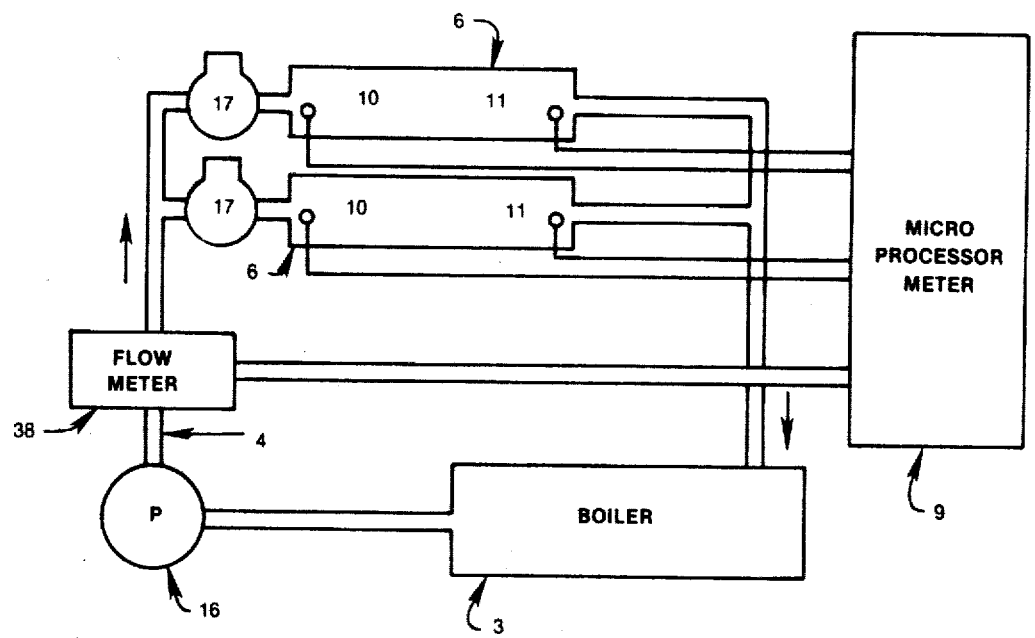
FIG. 4 is a simplified view similar to FIG. 2 illustrating an alternate and more sophisticated embodiment of the present invention wherein the heat or the energy consumption is based on a continuous measurement of the flow characteristics of a common pumping system.

For example, an alternate embodiment is illustrated in FIG. 4, in which like elements with FIG. 2 are correspondingly numbered. In FIG. 4, in addition to the temperature sensors 10 and 11 for the individual units 2, a single flow meter 38 is coupled to the output line 4 of the common heat source 3.

In this level of improvement, flow sensor 38 gives a highly accurate measurement of the actual total flow from the boiler 3. This provides an accurate signal of the flow rate from the circulation pump 16 and through the then open load branches. Variation in pump flow rate as measured by the common flow sensor 38 in particular provides a basis for adjusting the relative flow factor for each of the then open flow paths. This in combination with the equal flow resistance paths or determined flow resistances of each dwelling unit provides basic modifying data in the building complex microprocessor meter 9 to appropriately weigh the temperature differential data for an even more accurate determination of the actual consumption by each unit 2. In addition, the opening and closing of the zone valves may be monitored and the data used in the determination of the energy consumption. Thus, the present invention directly employs temperature differential signals with appropriate weighting with anyone or more flow related factors which are monitored or otherwise established, such as the pump curve characteristic, the flow resistance of the several paths, the opening and closing of the individual zone valves, the total flow rate from the common pump or the like to monitor the proportionate usage by the several consuming loads. Other factors may also be used. For example, the recent time-of-day billing being used by utilities may of course be conveniently introduced by monitoring of time of usage.

The present invention provides cost effective monitoring means for appropriate allocation of cost in a multiple energy consuming load complex.

Various modes in carrying out the invention are contemplated as being within the scope of the following claims, particularly pointing out and distinctly claiming the subject matter which is regarded as the invention.

I claim:

1. A multiple unit energy monitoring apparatus for measuring and processing a plurality of separate energy consuming loads connected to a common energy source, comprising a plurality of sensing means and adapted to be coupled one each to each of said loads and operable to produce an energy related data signal, a microprocessor meter means including first input means coupled to each of said sensing means for receiving and storing said energy related data signal, said microprocessor meter means having presettable data means preset in accordance with predetermined weighting characteristic data related to the consumption characteristic of each of said separate energy consuming loads and independently of the said energy related data signal for said consuming loads, and said microprocessor meter means being operable to modify said energy related data signals in accordance with said weighting characteristic data and thereby to provide a signal indicative of the individual energy consumption for each of the said energy consuming loads.

2. The apparatus of claim 1 wherein each of said sensing means includes temperature sensing means coupled to the input of the corresponding consuming load and to the output of the corresponding consuming load, and means to read the condition of the temperature sensing means at intervals of less than five minutes to effectively monitor the energy consumption on a continuous basis.

3. The apparatus of claim 2 wherein said intervals are substantially one minute intervals.

4. The apparatus of claim 1 wherein said sensing means includes temperature sensing means coupled to the input and to the output of the corresponding consuming load and generating an electrical signal proportional to the temperature differential, and means to sense the condition of the temperature sensing means at intervals of less than 5 minutes to effectively monitor the energy consumption on a continuous basis.

5. The apparatus of claim 2 wherein said common energy source is adapted to supply an energy carrier medium to said loads, said consuming loads are connected in parallel with each other, and said consuming loads having predetermined flow resistance to said energy carrier medium, said presettable data means being preset in accordance with said resistance of said consuming loads.

6. The apparatus of claim 2 wherein said energy source includes a pump means establishing an output in accordance with the total flow from said source, means for measuring said flow and establishing a related proportional control signal, and said microprocessor meter means being operable to modify the energy related signals for each of said loads in accordance with said control signal.

7. The apparatus of claim 2 wherein said consuming loads are connected in parallel with each other, individual valve means connect said consuming loads to said common energy source, said microprocessor meter means being connected to monitor the state of said valve means and said presettable data means being preset in accordance with the individual resistances of each consuming load.

8. The apparatus of claim 7 wherein said energy source includes a pump means establishing an output in accordance with the total flow from said source, flow measuring means for measuring said total flow and establishing a related proportional control signal, and said microprocessor meter means being connected to said flow measuring means to modify the energy related signals for each of said loads in accordance with said control signal.

9. The apparatus of claim 8 wherein a common pump means establishes circulation from said common energy source to each of said loads, and said presettable data means is set in accordance with the flow characteristic of said common pump means and said microprocessor meter means modifies said energy related signals in accordance with the total flow signals.

10. The apparatus of claim 2 having individual valve means connect said consuming loads to said common energy source, said microprocessor meter means being connected to monitor the state of said valve means and said presettable data means being preset in accordance with the individual resistances of each consuming load.

11. A method of monitoring and measuring energy consumption in a building complex having a plurality of energy consuming units individually and separately operatively coupled to a common energy source adapted to circulate a thermal energy carrier medium through said consuming units, each of said consuming units having inlet and outlet connections, comprising measuring the temperature differential between each of the inlet and outlet connections to each consuming unit, converting said temperature differential signal to a multibit digital temperature word signal corresponding to said temperature differential, establishing modifying digital word signals in accordance with system flow characteristics, said flow characteristics and said modifying digital word signals being independent of the temperature differential signal, modifying such temperature differential signal in accordance with said modifying word signals to establish an load consumption word signal, storing said temperature words and said modifying words and said load consumption words in a digital memory means, and periodically reading such memory means.

12. The method of claim 11 wherein said energy source includes a common prime mover for transfer of the energy carrier medium to said several consuming units, and said prime mover having a predetermined flow characteristic, and modifying said temperature differential signals in accordance with said flow characteristics of said common prime mover.

13. The method of claim 12 including measuring the temperature differential of each unit at intervals of less than 5 minutes to effectively monitor the energy consumption on a continuous basis.

14. The method of claim 12 wherein said energy source includes a common pump means establishing an output in accordance with a predetermined total flow characteristic and establishing related modifying words in accordance with said total flow characteristics.

15. The method of claim 14 wherein each of said consuming units includes an on-off control means, and establishing a modifying digital word signal operable in accordance with the turning on of said control means.

* * * * *